United States Patent [19]

Durand

[11] 4,101,012
[45] Jul. 18, 1978

[54] HYDROSTATIC BRAKING DEVICE FOR VEHICLES RUNNING DOWNHILL

[76] Inventor: François Durand, 11 rue du Bateau, 06 Antibes, France

[21] Appl. No.: 729,364

[22] Filed: Oct. 4, 1976

[30] Foreign Application Priority Data

Oct. 2, 1975 [FR] France ............................... 75 30286

[51] Int. Cl.² ............................................ F16D 57/00
[52] U.S. Cl. ................................ 188/290; 188/264 P; 192/4 B
[58] Field of Search ............... 188/290, 291, 292, 293, 188/294, 295, 296, 274, 71.2, 264 D, 264 E, 264 P; 192/113 R, 113 B, 12 A, 4 B

[56] References Cited

U.S. PATENT DOCUMENTS

| 2,373,138 | 4/1945 | Morith | 188/292 X |
| 3,159,246 | 12/1964 | Ahlen | 188/292 X |

*Primary Examiner*—Trygve M. Blix
*Assistant Examiner*—Douglas C. Butler
*Attorney, Agent, or Firm*—Young & Thompson

[57] ABSTRACT

A retarder for selectively braking a vehicle during downhill driving, comprises a stack of Belleville springs, and a pump driven by the impetus of the vehicle rolling downhill, to pump oil between the peripheries of the Belleville springs thereby to exert resistance to the pump and hence to the downhill rolling of the vehicle. The compression of the stack of the springs, and hence the amount of energy absorbed by the lamination of the oil between the peripheries of the springs, is selectively controlled by the operator.

5 Claims, 1 Drawing Figure

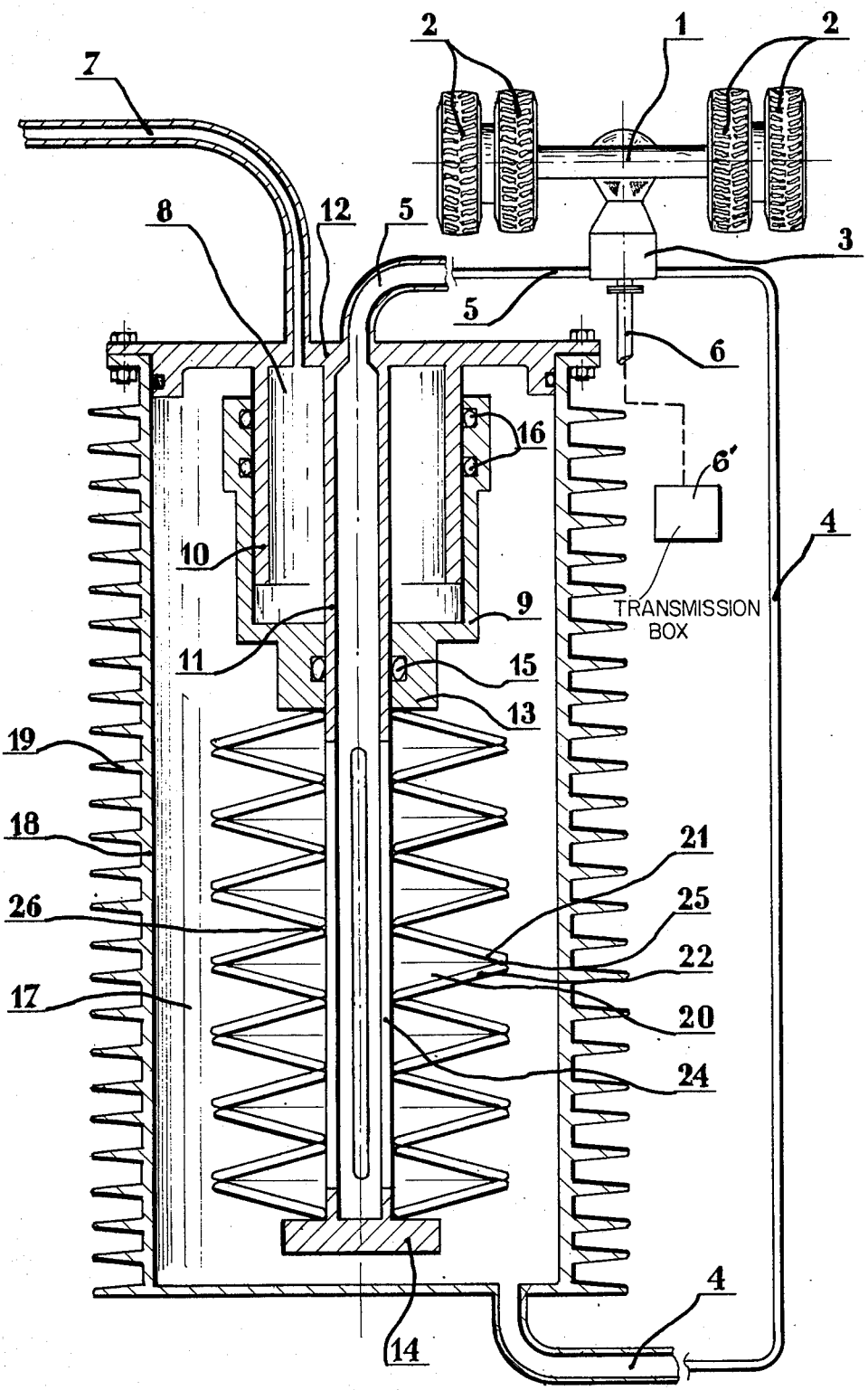

HYDROSTATIC BRAKING DEVICE FOR VEHICLES RUNNING DOWNHILL

BACKGROUND OF THE INVENTION

To avoid acceleration due to gravity driving downhill for miles, road or rail vehicles cannot use only their normal drum or disc brakes without great risks. Drum or disc brake capacities for heat dissipation are less than the quantity of heat that has to be dissipated during such downhill driving. Downhill braking using the transmission and the engine can be sufficient for vehicles with a very high power ratio, that is, 50 to 100 HP per ton. But for heavy vehicles with 8 to 10 HP per ton power rate, it is better to use a retarder which has to be installed between the transmission and the driving wheels.

Different types of retarders are known, most of them being electromagnetic or hydrodynamic. They are rather heavy and costly. The energy is converted into heat around the transmission shaft, and their braking torque at low speeds is very small.

The present invention relates to a hydrostatic retarder having a hydrostatic oil pump, preferably assembled on the input shaft of the differential, this pump forcing oil through a spill valve with pressure control, the oil passing from the spill valve to a cooling tank. The braking energy with this device is not converted into heat in the rotating parts, but in the spill valve, the heat being dissipated in a cooling tank. High braking torque at very low speeds can be generated, and this allows the use of this retarder as normal drum or disc brakes, in the case of failure of the normal brakes.

The conduits joining the pump, the spill valve and the cooling tank are large enough to minimize energy losses when the spill valve is completely open. For fast vehicles, it is preferably to have a clutch with synchronism between the input shaft of the differential and the oil pump. The synchro means need only transmit the torque necessary to put the pump and oil in motion, the spill valve being completely open and the oil being cold. Action on the spill valve control gives for each position of the control an oil pressure between the pump and the spill valve which is almost independent of the speed of rotation of the pump. This means that a braking torque at the input shaft of the differential for each position of the spill valve control will arise, which torque is independent of the speed of the vehicle.

BRIEF SUMMARY OF THE INVENTION

It is an important feature of this invention that the oil under pressure is laminated into long thin sheets between the peripheries of Belleville springs which can be associated with cooling fins. The point at which these springs separate at their peripheries is a function of the pressure set with the spill valve control. The spill valve is either immersed in or connected to a cooling tank or radiator, and a fan driven from the transmission shaft blows air over the tank or radiator. It is also possible to use an oil-water heat exchanger, the engine radiator being used to cool the water. The spill valve has a central tubular shaft one end of which is closed and has a circular abutment on which the stack of Belleville springs concentric to the tubular shaft is stacked. The other end of the tubular shaft is held by the cover of the control cylinder and is connected to the output pipe of the oil pump. The control piston is concentric with the tubular shaft, and circular seals make the braking oil independent of the control fluid which is disposed between the tubular shaft, the piston and the control cylinder. The quantity of control fluid introduced into the control cylinder acts on the control lever or pedal, and this, according to well known techniques, controls the load on the stack of Belleville springs.

The spaces between the central tubular shaft and the inner part of the Belleville springs are connected to the inner part of the central tubular shaft by slots in the central tubular shaft.

Thus the output pressure of the oil pump, that is to say, the braking torque, is almost a direct function of the shortening of the length of the stack of Belleville springs. It will also be appreciated that the lamination of the oil between the outer peripheries of the Belleville springs provides for a good dissipation of the braking energy in the oil.

BRIEF DESCRIPTION OF THE DRAWING

The accompanying drawing shows in cross section a retarder according to the present invention. In order to simplify the drawing, the differential and the oil pump assembled to it are drawn on a much smaller scale than the spill valve which is shown in section on the axis of the valve.

DETAILED DESCRIPTION

In the drawing, the differential axle 1 with its tires 2 supports the oil pump 3 with its input conduit 4 and its output conduit 5. The transmission axle 6 goes to the transmission box 6. Thus it will be seen that without any major modification, the oil pump can be located on the output shaft of the transmission box or at any place between the transmission box and the differential, there being cardan shafts joining then the oil pump with the differential and the transmission box.

A conduit 7 is connected in a well known manner either to a control lever or pedal (not shown) for selective operation of the device of the present invention. The pressure in the chamber 8 varies as the volume of chamber 8 and is a function of the position given to the control lever or pedal by the driver. According to the volume of the chamber 8, therefore, the cylinder 9 has a definite position relative to piston 10, which is fixed to tubular shaft 11 by cover 12.

Each position of the cylinder 9 relative to piston 10, corresponds to a certain load imposed on a stack of Belleville springs 21 and 22 which are disposed between the lower part 13 of the cylinder 9 and an abutment 14 located at the lower end of tubular shaft 11. Seals 15 and 16 provide fluidtightness for chamber 8 relative to a quantity of oil 17 located in a cooling tank 18 provided with external cooling fins 19.

A quantity of oil 20 is disposed between each pair of Belleville springs 21 and 22, this quantity of oil being provided via pump 3 and conduit 5 through tubular shaft 11 and slots 24 extending lengthwise thereof. Thus, for each length of the stack of Belleville springs, there is an oil pressure at 20 for which the outer margins 25 of the Belleville springs spring slightly apart so that oil is forced in laminar form between these slightly spread apart peripheries.

Each pressure necessary to spread apart the Belleville springs peripheries gives rise to a braking torque for the vehicle due to the drive of oil pump 3. Thus the outer and inner peripheries 25 and 26 of the Belleville springs will be ground and polished to a predetermined profile so as to have good fluidtightness as long as the pressure is not sufficient to spread apart the outer peripheries 25.

With a device according to the present invention, therefore, the braking torque is easy to control. The braking energy is dissipated by generating the energy necessary to laminate the oil between the peripheries of the Belleville springs.

It will also be appreciated that the fluid control cylinder 9 and piston 10 can be replaced with a mechanical actuator (not shown) using such conventional parts as nuts and screws or slides and rolls.

I claim:

1. A hydrostatic braking device for vehicles having a transmission shaft, a transmission, a wheel axle, and an oil pump driven by the transmission shaft between the transmission and the axle, said braking device comprising a spill valve, the spill valve comprising a central tubular shaft and a pile of Belleville springs surrounding the tubular shaft, the Belleville springs being arranged on the shaft in alternately opposite orientation so that pairs of adjacent springs define spaces between them that are enclosed by a said pair of springs, said tubular shaft opening into said spaces between the Belleville springs, the pump having an outlet communicating with the interior of said tubular shaft whereby when a said vehicle rolls downhill, the pump is driven to force oil into the interior of the tubular shaft and thence into said spaces and between the margins of the pairs of Belleville springs in order to brake said downhill rolling.

2. A hydrostatic braking device as claimed in claim 1, in which said spill valve is disposed in a cooling tank provided with cooling fins, that collects the oil that is extruded between said Belleville springs, and means to return said oil from said cooling tank to said pump.

3. A hydrostatic braking device as claimed in claim 1, and means selectively to compress said pile of Belleville springs thereby selectively to control the downhill braking force applied by said braking device.

4. A hydrostatic braking device as claimed in claim 3, said control means comprising a piston that slides on said central tubular shaft and that contacts one end of said pile of Belleville springs, and fluid pressure means selectively to move said piston axially along said shaft.

5. A hydrostatic braking device as claimed in claim 4, and an externally finned cooling tank that surrounds said spill valve, means to return oil from said cooling tank to said pump, one end of said cooling tank carrying a cylinder on which said piston slides, said shaft extending through and being secured to said one end of said cooling tank concentrically within said cylinder.

* * * * *